United States Patent [19]
Boutaghou et al.

[11] Patent Number: 6,125,099
[45] Date of Patent: Sep. 26, 2000

[54] DISK DRIVE SYSTEM, PROCESS AND COMPONENTS THEREOF FOR IMPROVED DISK STIFFNESS

[75] Inventors: Zine-Eddine Boutaghou, Vadnais Heights; Mary Cynthia Hipwell, Minneapolis, both of Minn.

[73] Assignee: Seagate Technology, Inc., Scotts Valley, Calif.

[21] Appl. No.: 09/077,351

[22] PCT Filed: May 22, 1998

[86] PCT No.: PCT/US98/09900

§ 371 Date: Jun. 17, 1999

§ 102(e) Date: Jun. 17, 1999

[87] PCT Pub. No.: WO99/05672

PCT Pub. Date: Feb. 4, 1999

Related U.S. Application Data

[60] Provisional application No. 60/053,473, Jul. 23, 1997.
[51] Int. Cl.[7] ................................................ G11B 5/84
[52] U.S. Cl. ............................................................ 369/272
[58] Field of Search .............. 369/272; 360/98.01–98.08

[56] References Cited

U.S. PATENT DOCUMENTS

| | | | |
|---|---|---|---|
| 3,838,464 | 9/1974 | Doyle | 360/137 |
| 3,912,282 | 10/1975 | Sano et al. | 274/39 R |
| 4,622,661 | 11/1986 | Hoogevenn et al. | 369/280 |
| 4,674,356 | 6/1987 | Kilgore | 74/573 |
| 5,422,776 | 6/1995 | Thorson et al. | 360/98.07 |
| 5,448,550 | 9/1995 | Mok et al. | 369/272 |

*Primary Examiner*—Allen T. Cao
*Attorney, Agent, or Firm*—Merchant & Gould, P.C.

[57] ABSTRACT

A disk drive system includes a disk having a stiffening structure for improved vibration resistance. The stiffening structure is configured to improve stiffness and vibration resistance with respect to the (0,1), (0,2) and (1,1) vibration modes. The stiffening structure includes a rib-stiffening structure composed of a framework of interconnected ribs. The framework includes a plurality of concentric annular ribs and a plurality of radially spaced, radial ribs. One or more annular ribs are disposed at one or more locations along the radial dimension of the disk at which nodes of annular vibrations occur. Also, one or more radial ribs are disposed at one or more locations around annular dimension of the disk at which nodes of radial vibrations occur. The stiffening structure is disposed within a substrate layer of the disk during manufacture of the disk structure.

4 Claims, 4 Drawing Sheets

DISK DRIVE SYSTEM, PROCESS AND COMPONENTS THEREOF FOR IMPROVED DISK STIFFNESS

This application is a National Stage of International Application No. PCT/US98/09900, filed May 22, 1998, which claims the benefit of U.S. Provisional application No. 60/053,473, filed Jul. 23 1997.

BACKGROUND OF THE INVENTION

1. Field of the Invention

The present invention relates, generally, to disk drive systems, data storage disks and processes of making and using the same with improved vibration inhibiting capabilities and, in preferred embodiments, to such systems, disks and processes which employ a stiffening structure, such as a framework of ribs, disposed within the disk.

2. Back Ground

Modern computers employ various forms of storage systems for storing programs and data. For example, various forms of disk drive systems have been designed to operate under the control of a computer to record information and/or retrieve recorded information on one or more recording disks. Such disk drives include hard disk drives which employ recording disks that have magnetizable (hard) recording material, optical disk drives which employ recording disks that have optically readable recording material, mageneto-optical (MO) disk drives which employ recording disks that have optically readable magenetizable recording material, or the like.

Conventional disk drive systems typically include one or more recording disks supported for relatively high speed rotation on a rotary spindle. For example, FIG. 1a shows a side view of portions of a conventional disk drive system, including a conventional data storage or recording disk 10 supported on a spindle 11. A disk drive motor (not shown) is operatively coupled to the spindle 11 for rotation of the spindle and the disk supported thereon. A recording and/or reading head 12 is supported by suitable head support structure (not shown) adjacent the recording surface of the disk. To simplify the disclosure, FIG. 1 is shown with a single recording disk 10 having a single recording surface and a single head 12. However, other conventional disk drive systems employ multiple disks, double-sided disks (disks with recording surfaces on both surfaces) and multiple heads.

For purposes of illustration, the disk 10 is described herein as an MO disk. As shown in FIG. 1a, the disk 10 has a central hub opening through which the spindle 11 extends, and is formed with multiple layers, including at least one substrate or support layer 14, a recording layer 15 supported on the substrate layer 14 and at least one protective layer 16 on the recording layer. Further layers, such as one or more layers of dielectric material, may also be included in the layered disk structure, for example, between the protective layer and the recording layer.

The disk 10 and spindle 11 are shown in a top view in FIG. 1b. The spindle 11 extends through a central opening, which defines an inside diameter, of the disk. The disk is secured at its inner diameter (ID), in a fixed relation with the spindle 11, and is supported such that the outer diameter (OD) portion of the disk is free from contact with other components. In this regard, the disk is clamped at its ID to the spindle 11 and is free at its OD. When the spindle 11 is rotatably driven, the disk 10 is cause to rotate with the spindle.

The head 12 is supported for movement in the radial direction of the disk, such that the head may be selectively positioned adjacent any recording location on the recording surface of the disk, as the disk is rotated. In operation, the head 12 is moved in the radial direction to align or register with a desired track location on the recording surface of the disk. Once aligned or registered with the desired track location, the head is operated to read or write information onto the recording surface at the desired track location. It is important to properly register the head with the track location to effect accurate reading or writing operations on the registered track.

Modern advances in disk drive technology have resulted in increased disk storage density and decreased track widths, such that greater amounts of information may be stored per given recording surface area. However, as track widths decrease (and storage density increases), the need for accurate head registration increases. In general, smaller track widths require greater head-to-track registration accuracies and have smaller alignment error tolerances. For example, for a disk with 10,000 tracks per inch, the track width is only about 100 $\mu$in and the total allowable (tolerable) off-track mis-registration may be no more than about 10 $\mu$in peak-to-peak.

Track mis-registration (TMR) may result from a variety of sources, including, for example, ball bearing non-repeatable run out, spindle-disk rocking vibrations and disk flutter. However, with recent and up-coming advances in disk drive spindle motor technology (including the introduction of hydrodynamic bearing spindle motors), the asynchronous vibrations caused by ball bearing non-repeatable run out and spindle-disk rocking vibration can be dramatically reduced. As a result, disk flutter can be a substantial factor in the cause of TMR.

Disk flutter can be generally characterized as the vibrations encountered by a disk, for example, as a result of fixing and supporting the disk only at its inside diameter to a rotary spindle. During rotation of the disk, the disk tends to vibrate in several modes.

For a given disk inner diameter (ID) to outer diameter (OD) ratio (ID/OD), the natural frequency of a disk is proportional to:

$$\frac{h}{R^2}\sqrt{\frac{E}{\rho(1-v^2)}} \qquad (1)$$

where h is disk thickness, R is disk outer radius, E is Young's modulus, $\rho$ is density and v is Poisson ratio. The vibration amplitude per unit force is proportional to:

$$\frac{R^4}{\eta D} \qquad (2)$$

where $\eta$ is disk material loss coefficient and D is disk rigidity and is defined by:

$$D = \frac{Eh^3}{12(1-v^2)} \qquad (3)$$

Disk vibrations may occur in several modes, depending on the input excitation frequency. Various vibration mode shapes for a disk having its ID clamped and OD free are represented by the top and side view diagrams of FIGS. 2a, 2b, 2c and 2d. The upper part of each of those figures shows a top view of a disk, with a shaded region indicating the nodal line(s) between vibration nodes. The bottom part of each of FIGS. 2a–2d shows a side-view representation of the vibration wave-shape of the corresponding vibration mode. A (m,n) mode represents the m and n nodal lines in the circumferential and radial directions, respectively. Thus, FIG. 2a represents a (0,0) mode vibration. FIG. 2b represents a (1,0) mode vibration. FIG. 2c represents a (0,1) mode vibration and FIG. 2d represents a (0,2) mode vibration.

Disk flutter may include one or more of the various vibration modes shown in FIGS. 2a–2b. MO media are particularly susceptible to the high amplitude of the (0,1), (0,2) and (1,1) vibration modes. These modes can greatly affect servo performance, since most servo systems have a limited bandwidth and rely on low amplitudes of the disk bending modes. Current MO media designs typically require a substantial increase in the disk thickness to reduce the amplitude of the above mentioned modes.

SUMMARY OF THE DISCLOSURE

Accordingly, it is an object of preferred embodiments of the present invention to provide a drive system, disk and process for inhibiting disk vibration during disk reading and/or writing operations.

It is a further object of preferred embodiments of the present invention to provide such a system, disk and process which is economical and which may be readily incorporated in disk manufacturing techniques.

It is a further object of preferred embodiments of the present invention to provide such a system, disk and process which does not require substantial increases in disk thickness.

In accordance with preferred embodiments of the present invention, a disk is provided with a stiffening structure, for increasing the stiffness of the disk for improved vibration resistance. In more preferred embodiments, the stiffening structure is configured to improve stiffness and vibration resistance with respect to the (0,1), (0,2) and (1,1) vibration modes.

In accordance with one preferred embodiment, the stiffening structure comprises a framework of interconnected ribs. In accordance with more preferred embodiments, the framework of interconnected ribs comprises at least one annual rib (and more preferably, a plurality of concentric annular ribs) and at least one radial rib (and more preferably, a plurality of radially spaced, radial ribs). In accordance with yet further preferred embodiments, one or more annular ribs are disposed at one or more locations along the radial dimension of the disk at which nodes of annular vibrations occur. Also in accordance with such further preferred embodiments, one or more radial ribs are disposed at one or more locations around annular dimension of the disk at which nodes of radial vibrations occur.

A rib-stiffening structure, according to preferred embodiments, is incorporated in the substrate layer of a disk, during manufacture of the disk. The rib stiffening structure may be included within the mold for the disk substrate, during the molding of the disk substrate. In this manner, the rib stiffening structure may be molded into the substrate portion of the disk. Alternatively, the rib stiffening structure may be included within another layer of a multi-layer disk structure or may be provided between layers of the disk structure. By designing the rib pattern of the rib stiffening structure to match shapes of the (0,1), (1,1), (0,2), etc. vibration modes, the rib stiffening structure can substantially reduce the amplitudes of vibrations in these modes, but preferably, does not affect the micro-waviness of the disk media.

BRIEF DESCRIPTION OF THE DRAWINGS

A detailed description of preferred embodiments of the invention will be made with reference to the accompanying drawings, wherein like numerals designate corresponding parts in the several figures.

FIG. 1b is a top view of the MO disk and spindle of the system shown in FIG. 1a.

DETAILED DESCRIPTION OF PREFERRED EMBODIMENTS

The following detailed description is of the best presently contemplated mode of implementing the invention. This description is not to be taken in a limiting sense, but is made merely for the purpose of illustrating the general principles of the invention. The scope of the invention is best defined by the appended claims.

The present invention relates, generally, to disk drive systems, data storage disks and processes of making and using the same with improved vibration inhibiting capabilities and, in preferred embodiments, to such systems, disks and processes which employ a stiffening structure, such as a framework of ribs, disposed within the disk.

Figure 1A:
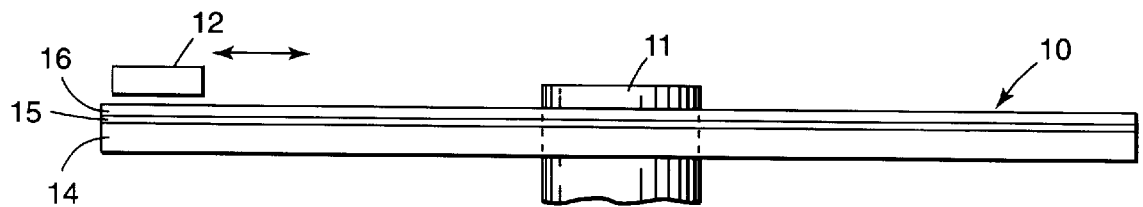
FIG. 1a is a side view of portions of a conventional disk drive system and MO disk.
Figure 1B:
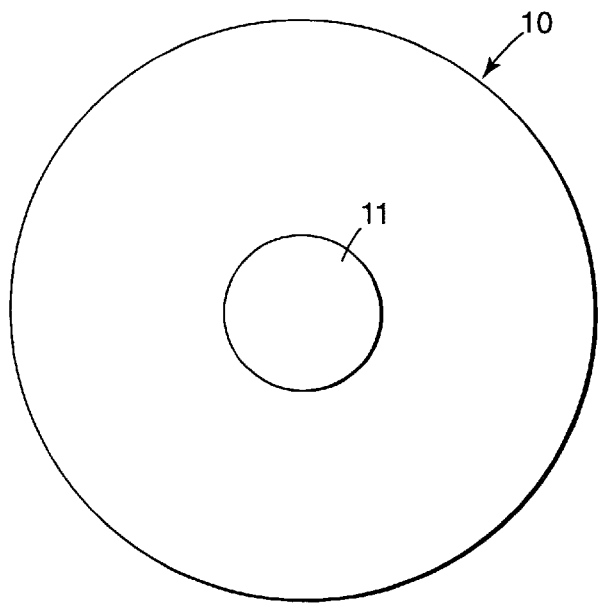
Figure 3A:
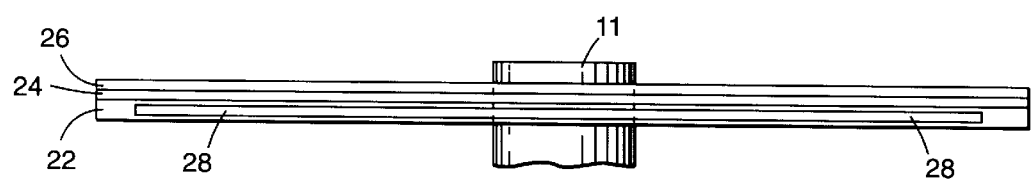
FIG. 3a is a side view of a single sided MO disk according to an embodiment of the present invention.

A side view of a single-sided data storage disk 20 in accordance with a preferred embodiment of the present invention is shown, generally, in FIG. 3a. The disk 20 may be included in a disk drive system in the same manner that disk 10 is shown in such a system in FIG. 1a. Similar to the general structure of the conventional disk 10 of FIG. 1a, the disk 20 includes a center hub opening through which a spindle 11 extends, a substrate portion 22, a layer of recording material 24 and one or more protective, dielelctric and/or other layers 26.

Figure 3B:
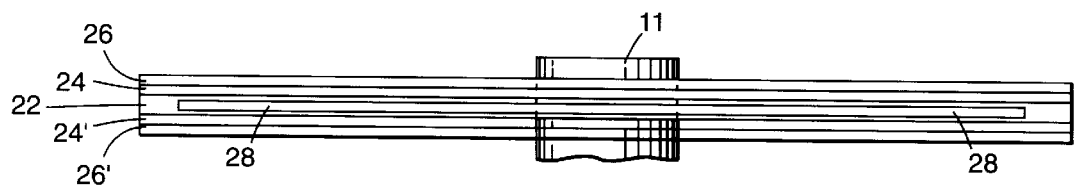
FIG. 3b is a side view of a double sided MO disk according to an embodiment of the present invention.

The embodiment shown in FIG. 3a is a single-sided disk embodiment, wherein the recording material layer is exposed for reading and/or recording of information through only one disk surface (the upward-facing surface in FIG. 3a). However, further embodiments comprise double-sided disks, wherein reading and/or recording of information may occur through both disk surfaces. An example of a double-sided disk embodiment is shown in FIG. 3b, wherein a second layer of recording material 24' and one or more second protective, dielectric and/or other layers 26' are provided on the opposite face of the substrate layer 22 (the downward-directed face in FIG. 3b), with respect to the face on which the first layers 24 and 26 are provided.

In accordance with preferred embodiments of the present invention, the disk is provided with a stiffening structure, for increasing the stiffness of the disk, for improved vibration resistance. In more preferred embodiments, the stiffening structure is configured to improve stiffness and vibration resistance with respect to the (0,1), (0,2) and (1,1) vibration modes. For example, FIGS. 3a and 3b show embodiments in which a rib-stiffening structure 28 is disposed within the substrate portion.

In accordance with one preferred embodiment, the stiffening structure comprises a rib-stiffening structure composed of a framework of interconnected ribs. In accordance with more preferred embodiments, the framework of interconnected ribs comprises at least one annual rib (and more preferably, a plurality of concentric annular ribs) and at least one radial rib (and more preferably, a plurality of radially spaced, radial ribs). In accordance with yet further preferred embodiments, one or more annular ribs are disposed at one or more locations along the radial dimension of the disk at which nodes of annular vibrations occur. Also in accordance with such further preferred embodiments, one or more radial ribs are disposed at one or more locations around annular dimension of the disk at which nodes of radial vibrations occur. In this regard, the frame-work of interconnected ribs is preferably constructed with a predetermined pattern, designed to reduce the amplitude of (0,1), (0,2) and (1,1) mode vibrations.

Figure 4:
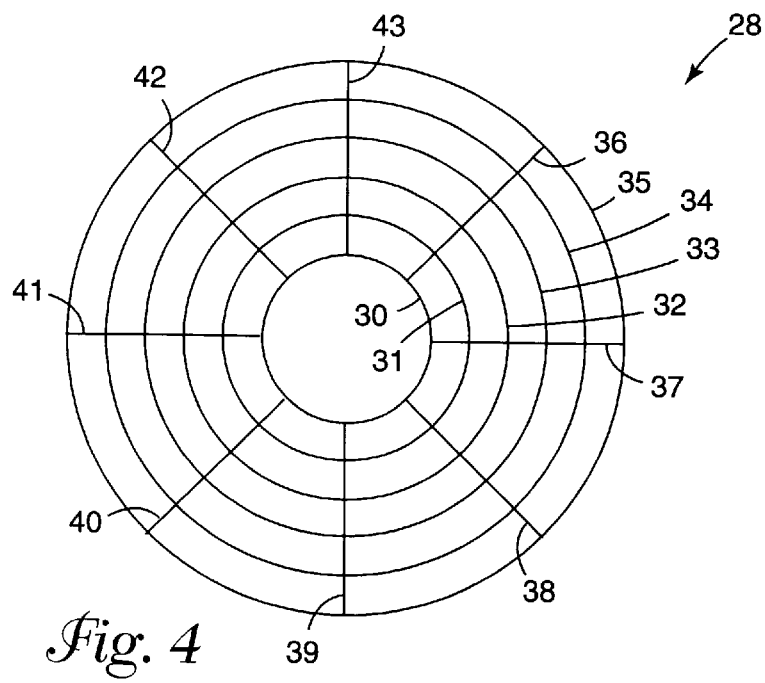
FIG. 4 is a top view of a stiffening structure according to an embodiment of the present invention.

A first embodiment of a rib pattern for a frame-work structure 28 is shown in FIG. 4 and includes a plurality of concentric ring-shaped or annular ribs which are interconnected by a plurality of radially disposed ribs. The FIG. 4 embodiment, includes six concentric, annular ribs 30, 31, 32, 33, 34 and 35 of mutually different diameters, and eight radial ribs 36, 37, 38, 39, 40, 41, 42 and 43. However, other embodiments may include more or less than six concentric, annular ribs and/or more or less than eight radial ribs.

Figure 2A:
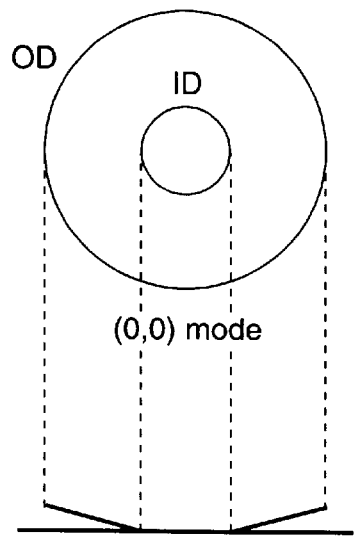
FIGS. 2a–2d show top and side view representations of the shapes of (0,0), (1,0), (0,1) and (02) mode vibrations for ID clamped, OD free disks.
Figure 2B:
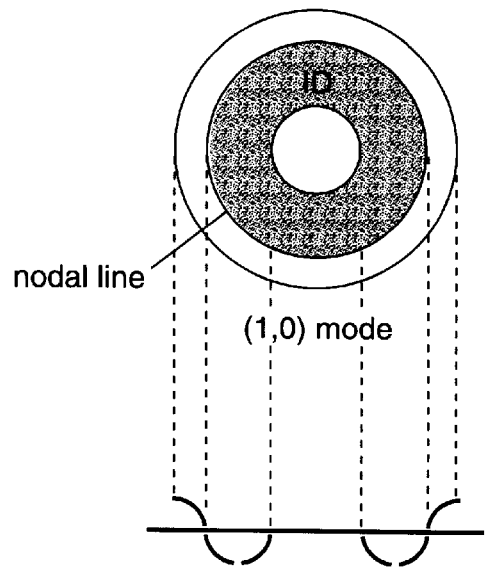
Figure 2C:
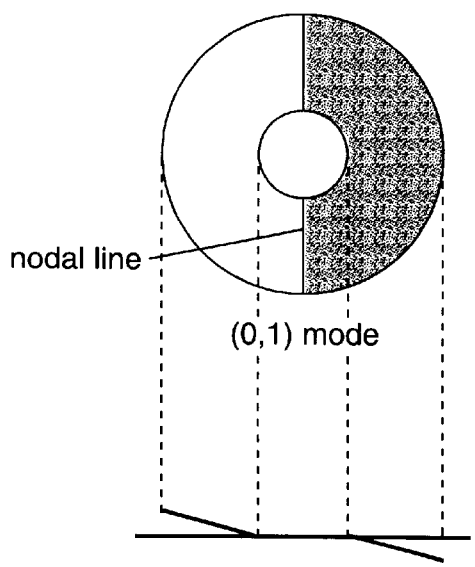
Figure 2D:
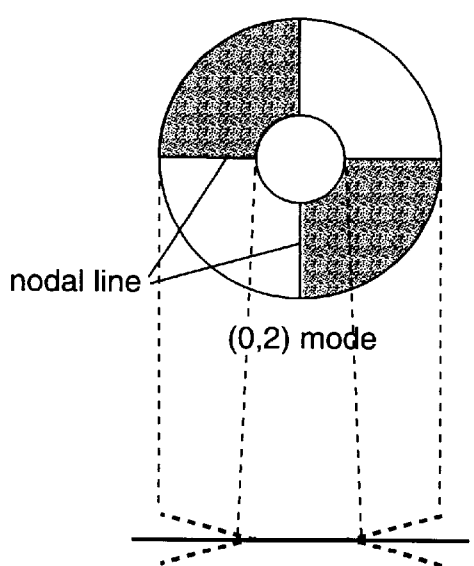

In preferred embodiments, each annular rib is located at a node location of an annular vibration wave-shape. Thus, with respect to a single anular vibration wave-shape shown in FIG. 2b, an annular rib is preferably located at the radial position at which the anular vibration wave crosses the horizontal axis (shown as the lower portion of FIG. 2b). As a disk is likely to encounter multiple annular vibration waves, preferred stiffening structure embodiments employ a plurality of annular ribs located at a plurality of disk radii corresponding to the radii at which the nodes of the plural annular vibration wave-shapes are likely to occur.

The ribs are formed of a suitably rigid material, including, but not limited to, metal, ceramic, reinforced laminate, glass, hard plastic, polycarbonate, or the like. The stiffness of the rib material and the arrangement of the ribs in the framework pattern are preferably selected to optimize the vibration suppression characteristics of the frame-work. The annular ribs help suppress vibrations having annular node components. The radial ribs help suppress vibrations having radial node components. The connections of the radial ribs with the annular ribs provides a unitary frame-work structure.

In the FIG. 4 embodiment, the plurality of concentric, annular ribs includes an inner annular rib 30 having a diameter at least as large as (and preferably slightly larger than) the outer diameter of the central hub opening 21 of the disk 20 (FIG. 2). The plurality of concentric, annular ribs also includes an outer annular rib 35 having a diameter up to (and preferably slightly less than) the overall diameter of the disk 20. The further concentric, annular ribs 31–34 have diameters between the diameter of the inner rib 30 and the diameter of the outer rib 35 and are spaced between the inner and outer ribs.

Each of the radial ribs 36–43 in the FIG. 3 embodiment extends from the inner annular rib 30 to the outer annular rib 35 and is connected to each of the annular ribs 30–35. The radial ribs 36–43 are equally spaced with respect to the circumference of the frame-work and disk.

While a structure as shown in FIG. 4 can provide a generally uniform stiffening resistance to annular and radial vibrations over the entire disk diameter, it has been found that vibration amplitudes tend to be greater at the outer radial dimensions of the disk. Accordingly, further preferred embodiments employ a frame-work of ribs designed to increase stiffness and provide greater resistance to vibrations at the outer disk dimensions than at the inner disk dimensions. For example, FIG. 5 shows a pattern for a framework structure 26 according to a further embodiment designed to enhance disk stiffness at the outer disk dimensions.

Figure 5:
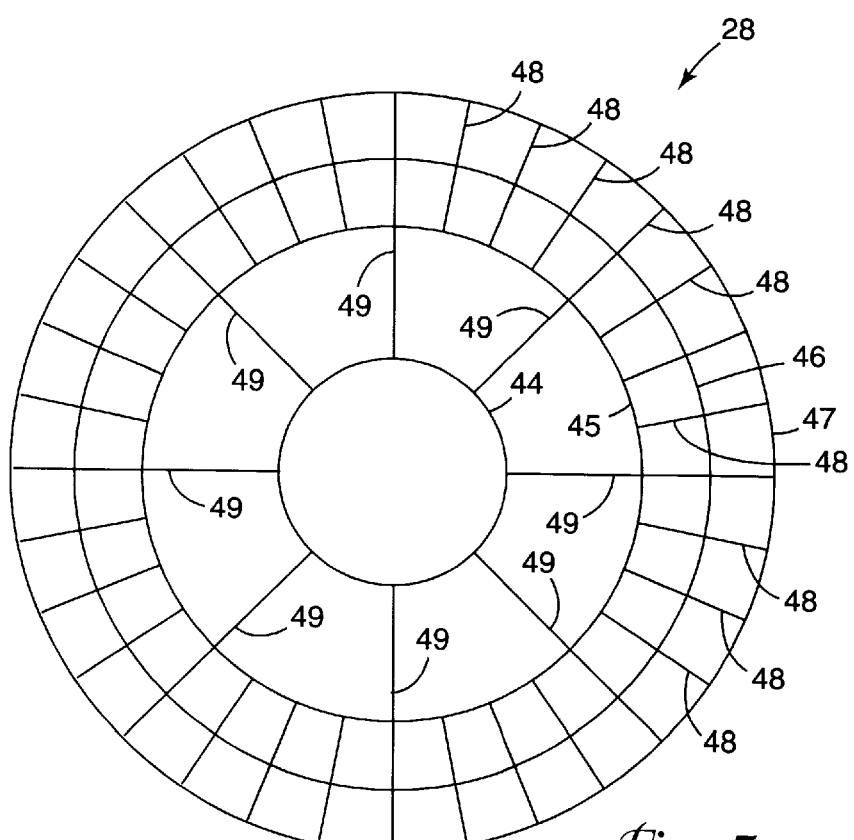
FIG. 5 is a top view of a stiffening structure according to a further embodiment of the present invention.

The framework shown in FIG. 5 includes a plurality of concentric, annular ribs and a plurality of radial ribs connected with the annular ribs. The concentric, annular ribs in the FIG. 5 embodiment include an inner annular rib 44 and three outer annular ribs 45, 46 and 47 having greater diameters than the inner rib 44. The three outer annular ribs are of mutually different diameters, such that one outer annular rib 45 defines a smaller diameter than the other outer annular ribs, and a further outer annular rib 47 defines a larger diameter than the other outer annular ribs. While the illustrated embodiment includes one inner annular rib 44 and three outer annular ribs 45–47, it will be understood that further embodiments may employ more than one inner annular rib and more or less than three outer annular ribs.

The plurality of radial ribs in the FIG. 5 embodiment includes a first plurality of radial ribs, each of which extend from the smallest diameter outer annular rib 45 to the largest diameter outer annular rib 47. The plurality of radial ribs also includes a second plurality of radial ribs, each of which extend from the inner annular rib 44 to the largest diameter outer annular rib 47. For purposes of simplifying the drawing, the ribs in the first plurality of radial ribs are identified by the common reference character 48 and the ribs in the second plurality of radial ribs are identified by the common reference character 49.

According to one preferred embodiment, a suitable stiffening structure, such as described above, is disposed in the substrate portion 22, during manufacture of the disk 20. The disk 20 may be manufactured by forming an annular, disk-shaped substrate layer from a molded substrate material, for example, but not limited to plastic, glass, or the like.

As part of the molding step, a suitable substrate material is received in a suitably shaped mold. For example, the substrate material may be provided in liquid phase and poured or otherwise communicated into the mold. In addition, a pre-formed stiffening structure, such as a framework of ribs as described above, is also disposed within the mold. The liquid phase substrate material is then solidified (for example, by reducing the material temperature, curing the material or otherwise causing the material to transition from a liquid phase to a solid phase) with the stiffening structure disposed therein.

Once the substrate with the stiffening structure therein is formed, a layer 24 of suitable recording material is formed on at least one surface of the substrate. Various recording materials and processes for forming recording materials on substrate surfaces are well known in the art. In addition, further layers, such as one or more dielectric layer, one or more protective layer or the like are formed on the recording material and substrate layers, in accordance with well known procedures for forming such layers.

In embodiment in which the stiffening structure is composed of a framework of ribs, such as described above, the framework structure may be formed as a unitary, integral structure, by suitable molding techniques. In further embodiments, the annular and radial ribs may be formed as separate elements by suitable manufacturing techniques (including, but not limited to, molding, extrusion, cutting, stamping or the like) and then interconnected (for example, but not limited to, by adhesives, solder or other molten connecting material, or the like) to form a unitary framework structure.

While preferred embodiments of the present invention are described above with reference to MO disks and MO disk drive systems and processes, other embodiments apply to other forms of recording disks, including but not limited to magnetic recording disks, compact disks (CDs), other forms of optical disks, or the like. Also, it is recognized that certain disk materials, such as plastics, are more susceptible to high amplitude vibrations than other disk materials, such as glass or aluminum and, thus, may benefit more from the present invention than glass or aluminum disks. However, disks formed of even the stiffer materials, such as glass or aluminum, can benefit from further stiffening structures, particularly as track widths decrease and alignment tolerances decrease. Accordingly, while preferred embodiments of the present invention employ plastic disk substrates, other embodiments employ substrates formed of other materials including, but not limited to glass, aluminum, silicon, or the like.

Furthermore, while embodiments discussed above show a stiffening structure 26 disposed within a substrate layer, other embodiments may employ a stiffening structure disposed in other layers of the disk structure, for example, in one or more of the layers 24 and 26, or between layers of the disk structure. If the stiffening structure is disposed in a layer between a disk surface through which reading and/or recording occurs and the recording layer, then the stiffening structure may be either composed of a material which is substantially transparent to the reading and/or writing radiation. Alternatively, the stiffening structure may be configured to expose a substantial portion of the recording layer track locations (for example, between ribs of the framework).

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A recording disk comprising: a substrate layer; at least one layer of recording material supported on the substrate layer, a stiffening structure fixed with respect to the substrate layer wherein said stiffening structure comprises a framework composed of:
   at least one inner annular rib;
   a plurality of outer annular ribs of greater diameter than said at least one inner annular rib and arranged concentric with each other and with said at least one inner annular rib;
   at least one radial rib connected to said plurality of outer annular ribs and free of direct connection with said at least one inner annular rib; and
   at least one radial rib connected to at least one inner annular rib and at least one outer annular rib.

2. A recording disk comprising: a substrate layer; at least one layer of recording material supported on the substrate layer, a stiffening structure fixed with respect to the substrate layer wherein said stiffening structure comprises a framework composed of:
   at least one inner annular rib;
   a plurality of outer annular ribs of greater diameter than said at least one inner annular rib and arranged concentric with each other and with said at least one inner annular rib;
   a first plurality of radial ribs connected to said plurality of outer annular ribs and free of direct connection with said at least one inner annular rib; and
   a second plurality of radial ribs connected to at least one inner annular rib and said plurality of outer annular ribs.

3. A recording disk comprising: a recording disk having a central hub, a substrate layer extending radially out from the central hub, at least one layer of recording material supported on the substrate layer and a stiffening structure fixed with respect to the substrate layer;
   a rotatable spindle defining a rotation axis, wherein said spindle is coupled to said central hub of said disk for imparting rotary motion to said disk; and
   a driver for rotatably driving the spindle and disk about the rotation axis of said spindle, wherein said stiffening structure comprises a framework composed of:
   at least one inner annular rib;
   a plurality of outer annular ribs of greater diameter than said at least one inner annular rib and arranged concentric with each other and with said at least one inner annular rib;
   at least one radial rib connected to said plurality of outer annular ribs and free of direct connection with said at least one inner annular rib; and
   at least one radial rib connected to at least one inner annular rib and at least one outer annular rib.

4. A recording disk comprising: a recording disk having a central hub, a substrate layer extending radially out from the central hub, at least one layer of recording material supported on the substrate layer and a stiffening structure fixed with respect to the substrate layer;
   a rotatable spindle defining a rotation axis, wherein said spindle is coupled to said central hub of said disk for imparting rotary motion to said disk; and
   a driver for rotatably driving the spindle and disk about the rotation axis of said spindle, wherein said stiffening structure comprises a framework composed of:
   at least one inner annular rib;
   a plurality of outer annular ribs of greater diameter than said at least one inner annular rib and arranged concentric with each other and with said at least one inner annular rib;
   a first plurality of radial ribs connected to said plurality of outer annular ribs and free of direct connection with said at least one inner annular rib; and
   a second plurality of radial ribs connected to at least one inner annular rib and said plurality of outer annular ribs.

* * * * *